(12) United States Patent  (10) Patent No.: US 7,568,542 B2
Fukuda  (45) Date of Patent: Aug. 4, 2009

(54) OCCUPANT PROTECTION DEVICE

(75) Inventor: Shunichi Fukuda, Atsugi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 588 days.

(21) Appl. No.: 11/099,604

(22) Filed: Apr. 6, 2005

(65) Prior Publication Data

US 2005/0230174 A1 Oct. 20, 2005

(30) Foreign Application Priority Data

Apr. 19, 2004 (JP) ............................ P2004-122743

(51) Int. Cl.
B60R 21/00 (2006.01)
(52) U.S. Cl. ..................................... 180/268
(58) Field of Classification Search ................. 180/268; 280/801.1, 806–808
See application file for complete search history.

(56) References Cited

U.S. PATENT DOCUMENTS 7,029,033 B2 * 4/2006 Tobata ......................... 280/807
2004/0080204 A1 * 4/2004 Enomoto et al. ............. 297/480

FOREIGN PATENT DOCUMENTS

| JP | 6-286581 A | 10/1994 |
| JP | 2001-114069 A | 4/2001 |
| JP | 2002-087210 A | 3/2002 |
| JP | 2003-327076 A | 11/2003 |
| JP | 2005-041256 A | 2/2005 |
| JP | 2005028916 A * | 2/2005 |

OTHER PUBLICATIONS

Japanese Office Action with English translation issued in corresponding Japanese Patent Application No. 2004-122743, dated Mar. 20, 2007.

* cited by examiner

Primary Examiner—Faye M. Fleming
(74) Attorney, Agent, or Firm—McDermott Will & Emery LLP

(57) ABSTRACT

An occupant protection device of the present invention has: a first motor which retracts a webbing of a driver seat; a second motor which retracts a webbing of a front passenger seat or a rear seat; a brake pedal sensor which detects movement of a brake pedal; and a control device which controls the first motor to retract the webbing of the driver seat when a detection value of the brake pedal sensor has exceeded an operation threshold value of the first motor, and controls the second motor to retract the webbing of the front passenger seat or the rear seat when the detection value of the brake pedal sensor has exceeded an operation threshold value of the second motor. Further, in the control device, the operation threshold value of the second motor is set to be lower than the operation threshold value of the first motor. By this device, it is possible to limit a forward shift of an occupant without making the occupant feel uncomfortable even at the time of unexpected braking such as emergency braking.

3 Claims, 2 Drawing Sheets

OCCUPANT PROTECTION DEVICE

BACKGROUND OF THE INVENTION

1. Field of the Invention

The present invention relates to an occupant protection device which retracts webbing of a seat belt assembly by using a motor. In particular, the present invention relates to an occupant protection device capable of limiting forward shift of the occupant while preventing making the occupant feel uncomfortable even at the time of unexpected braking such as emergency braking.

2. Description of the Related Art

The technique disclosed in Japanese Patent Application Laid-Open No. 2001-114069 is an example of the earlier techniques. This technique controls the seat belt assembly of the driver and seat belt assemblies of occupants other than the driver differently.

SUMMARY OF THE INVENTION

In the technique disclosed in the above gazette, the webbing of the seat belt assembly is retracted by a motor in accordance with a collision prediction signal, and the retraction forces are different between the driver seat and the seats other than the driver seat. However, in general, there is more degree of freedom for the sitting posture of the occupants of the seats other than the driver seat compared with that of the driver seat. Even when the retraction load (webbing tension) of the driver seat and those of the seats other than the driver seat are different, while the position of the driver does not shift much since the driver can bear up using the steering and/or the pedal, the occupants other than the driver cannot bear up using the steering or the pedal unlike the driver. Accordingly, there is a possibility that the shift amount of the occupants of the seats other than the driver seat becomes large. Moreover, there has been a problem that the occupants other than the driver feel uncomfortable by being pulled with a strong force when the webbing retraction load of the seats other than that of the driver seat is increased.

Further, in the earlier technique, the retraction load of the webbing is varied by controlling the value of the current passing through the motor. Therefore, to increase the retraction load, it is necessary to increase the current value. Thus, it is necessary to increase the scales of the motors and the ECU, which results in the device with a larger scale and an increased cost.

The present invention is made in view of the above problems, and an object thereof is to provide an occupant protection device capable of limiting a forward shift of an occupant without making the occupant feel uncomfortable even at the time of unexpected braking such as emergency braking.

The first aspect of the present invention provides an occupant protection device comprising: a first motor which retracts a webbing of a driver seat; a second motor which retracts a webbing of a front passenger seat or a rear seat; a brake pedal sensor which detects movement of a brake pedal; and a control device which controls the first motor to retract the webbing of the driver seat when a detection value of the brake pedal sensor has exceeded an operation threshold value of the first motor, and controls the second motor to retract the webbing of the front passenger seat or the rear seat when the detection value of the brake pedal sensor has exceeded an operation threshold value of the second motor, wherein, in the control device, the operation threshold value of the second motor is set to be lower than the operation threshold value of the first motor.

The second aspect of the present invention provides an occupant protection device comprising: a first motor which retracts a webbing of a driver seat; a second motor which retracts a webbing of a front passenger seat or a rear seat; a brake pedal sensor which detects movement of a brake pedal; and control means for controlling the first motor to retract the webbing of the drivers seat when a detection value of the brake pedal sensor has exceeded an operation threshold value of the first motor, and controlling the second motor to retract the webbing of the front passenger seat or the rear seat when the detection value of the brake pedal sensor has exceeded an operation threshold value of the second motor, wherein, in the control means, the operation threshold value of the second motor is set to be lower than the operation threshold value of the first motor.

The third aspect of the present invention provides an occupant protection method comprising: detecting movement of a brake pedal by a brake pedal sensor; retracting a webbing of a driver seat by a first motor when a detection value of the brake pedal sensor has exceeded an operation threshold value of the first motor; and retracting a webbing of a front passenger seat or a rear seat by a second motor when a detection value of the brake pedal sensor has exceeded an operation threshold value of the second motor, wherein the operation threshold value of the second motor is set to be lower than the threshold value of the first motor.

BRIEF DESCRIPTION OF THE DRAWINGS

The invention will now be described with reference to the accompanying drawings wherein.

DETAILED DESCRIPTION OF THE PREFERRED EMBODIMENT

Hereinbelow, an embodiment of an occupant protection device according to the present invention will be described in detail with reference to the drawings.

Figure 1:
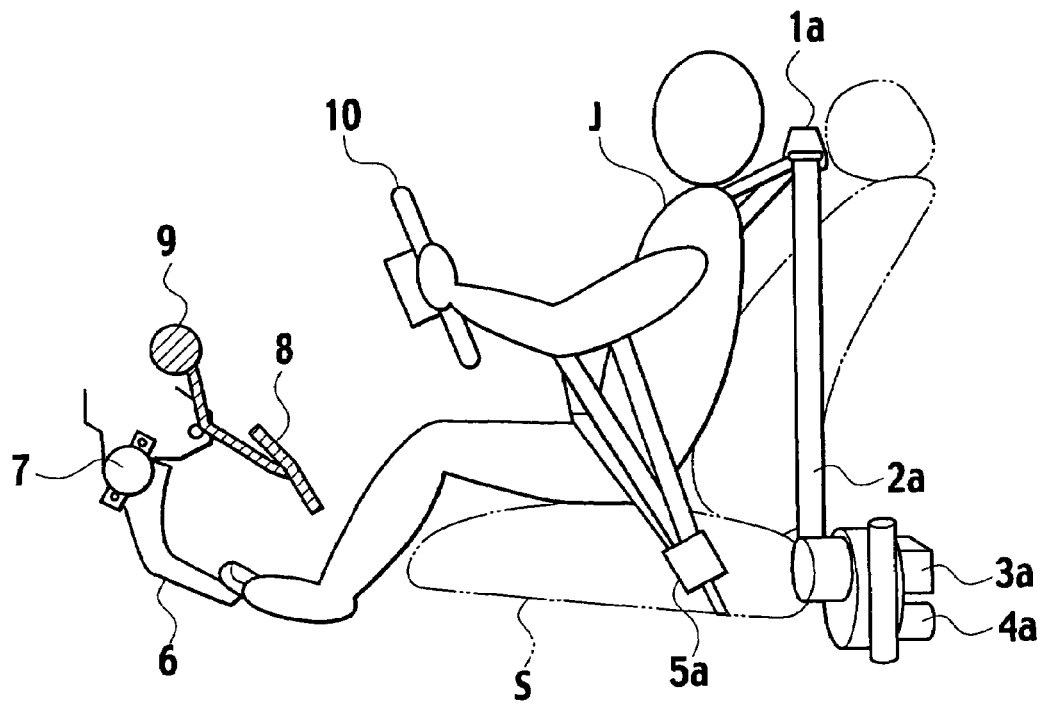
FIG. 1 is an explanatory view showing a configuration of an occupant protection device according to an embodiment of the present invention.

In FIG. 1, the occupant protection device of the embodiment includes a driver seat webbing 2a which holds a driver J seated on a seat S, a driver seat motor 4a which winds an end side of the driver seat webbing 2a, and a driver seat retractor 3a. The other end side of the driver seat webbing 2a is fixed to the vehicle body through a driver seat shoulder anchor 1a disposed on the door side of the seat S. Here, the driver seat retractor 3a retracts the driver seat webbing 2a, and prevents the driver seat webbing 2a from being pulled out when the vehicle body is slowed down by a predetermined deceleration.

A tongue is movably provided at a middle portion of the driver seat webbing 2a, and the tongue is removably engaged with a driver seat inner buckle 5a fixed to the vehicle body, on the vehicle center side of the seat S. When the tongue is engaged with the driver seat inner buckle 5a, the driver seat webbing 2a is provided from a shoulder to a waist of the driver J, thus fixing the upper body of the driver J to the seat S.

At the feet of the driver J, there are provided a brake pedal 6 and a brake pedal sensor 7 which detects movement of the brake pedal 6, namely, a timing of starting pressing the pedal, an amount of pressing the pedal, a speed of pressing the pedal, and the like. There are further provided an accelerator pedal 8 and an accelerator pedal sensor 9 which detects movement of the accelerator pedal 8, namely, a timing of starting pressing the pedal, an amount of pressing the pedal, a speed of pressing the pedal, and the like.

Figure 2:
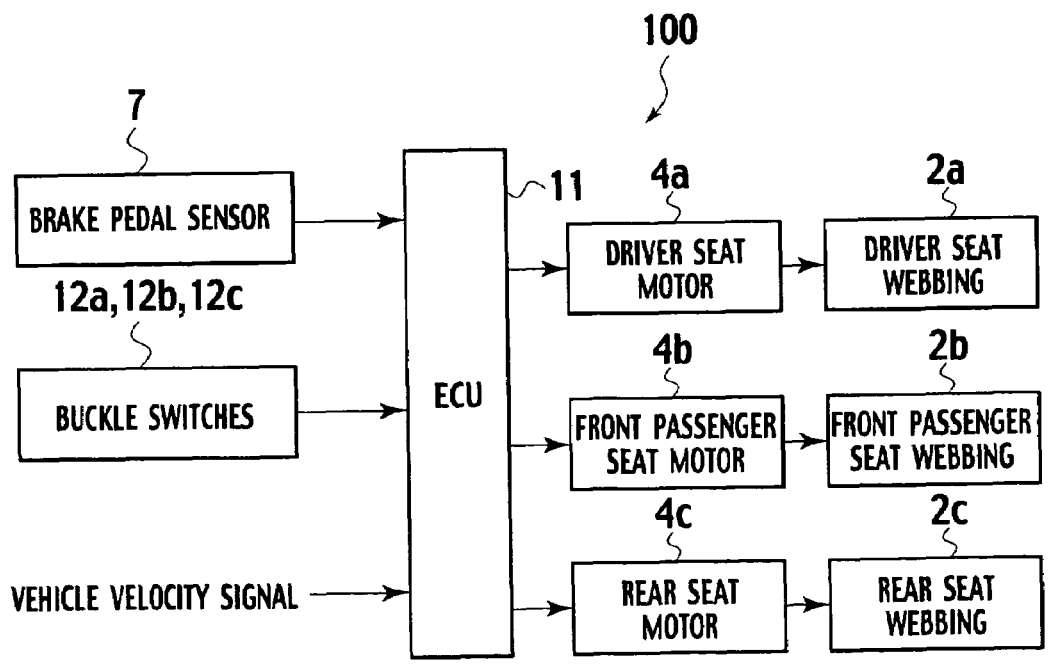
FIG. 2 is a structural view of the occupant protection device of the embodiment.

In FIG. 1, only the structure of the occupant protection device of the driver seat is shown; however, the protection devices of other seats such as the front passenger seat and a rear seat have a similar structure. That is, as shown in FIG. 2, the occupant protection device 100 of the present embodiment includes the driver seat webbing 2a, a front passenger seat webbing 2b, and a rear seat webbing 2c. Moreover, the occupant protection device 100 includes a driver seat motor 4a which retracts the driver seat webbing 2a, a front passenger seat motor 4b which retracts the front passenger seat webbing 2b, and a rear seat motor 4c which retracts a rear seat webbing 2c.

The occupant protection device 100 further includes an electronic control unit (ECU) which controls the driver seat motor 4a, front passenger seat motor 4b and rear seat motor 4c. To the ECU 11, there are provided a brake signal obtained from the brake pedal sensor 7, an acceleration signal obtained from the accelerator pedal sensor 9 and a detection signal of a buckle switch 12a, 12b or 12c which detects that a tongue is inserted into an inner buckle. Moreover, a vehicle velocity signal is provided to the ECU 11 from a vehicle velocity detection device (not shown) mounted on the vehicle.

The ECU 11 judges that an emergency braking operation is performed when a detection value based on a vehicle driving operation has exceeded a predetermined motor operation threshold value. In other words, in the embodiment, the ECU 11 judges that an emergency braking operation is performed when the pressing amount or pressing speed of the brake pedal 6 has exceeded a predetermined motor operation threshold value. After the judgment, the ECU 11 actuates the driver seat motor 4a, front passenger seat motor 4b and rear seat motor 4c, which respectively retracts the driver seat webbing 2a, front passenger seat webbing 2b and rear seat webbing 2c to restrain the driver J and the other occupants.

Here, the ECU 11 sets operation threshold values of the front passenger seat motor 4b and the rear seat motor 4c to be lower than that of the driver seat motor 4a so that the timing of retraction of the webbings of the seats other than the driver seat is earlier than the timing of retraction of the webbing of the driver seat.

Figure 3:
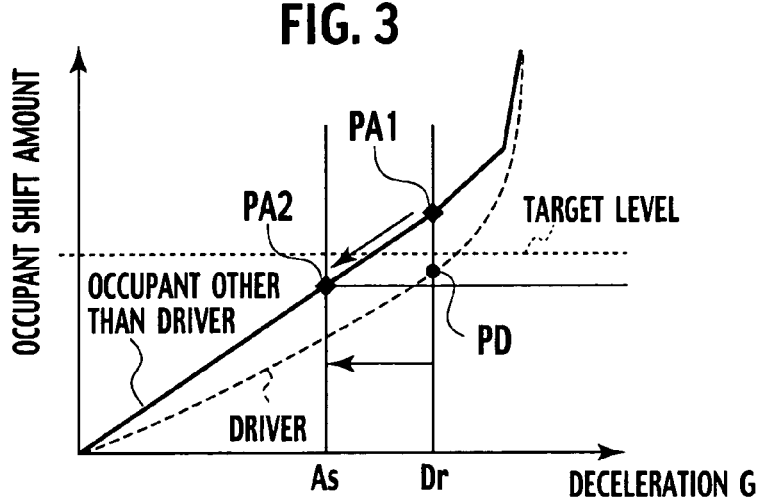
FIG. 3 is a view for explaining a principle of the present invention.

Next, with reference to FIGS. 3, 4 and 5, the principle and an operation of the occupant protection device 100 of the embodiment having the above structure will be described.

First, the principle will be described with reference to FIG. 3. FIG. 3 shows a shift amount of the body of the occupant on the axis of ordinate and a deceleration G on the axis of abscissa. In FIG. 3, a change in the frontward shift amount of the driver upon braking is shown by a broken line, and a change in the frontward shift amount of the occupants other than the driver upon braking is shown by the solid line. As shown in FIG. 3, the frontward shift amount of the driver does not increase in proportion to a braking deceleration G, since the driver can bear up using the steering 10 until a high braking deceleration G is generated, even when an emergency control such as emergency braking is performed. In contrast, the frontward shift amount of the occupants of seats other than the driver seat, such as the front passenger seat and the rear seat, increases in proportion to the braking deceleration G since it is not possible to bear up when emergency control such as emergency braking is performed.

When it is assumed that the shift amounts of the occupants are set to the target level shown in the drawing, and if the operation threshold values of the motors are set such that the webbings are retracted at a time when the deceleration G is Dr so that the shift amount of the driver becomes the target level or lower, the shift amount of the driver (PD in the drawing) does not exceed the target level. However, the shift amount of the occupants other than the driver (PA1 in the drawing) becomes a shift amount largely exceeding the target level.

As shown in the description of the related art, in order to keep the shift amount of the occupants other than the driver within the target level, the tension of the webbings of the occupants other than the driver may be set higher than that of the webbing of the driver. However, as described above, although the shift amount can be reduced by increasing the tension of the webbing, there has been a problem that there is a limit in increasing the tension, since the occupants feel unconformable when pulled with a strong force.

To keep the shift amount of the occupants other than the driver within the target level, the operation threshold values of the motors may be set such that the webbing is retracted when the deceleration G is As. Then, both the shift amount of the occupants other than the driver (PA2 in the drawing) and the shift amount of the driver are kept within the target level. However, the shift amount of the driver is far below the target level, and it is more likely for the driver to feel annoyed since the timing of retraction of the webbing is too early.

Thus, in the present invention, the timing of retraction of the webbing of the driver seat is different from that of the other seat upon controlling thereof. In other words, for the driver seat, to keep the shift amount of the driver within the target level, the operation threshold value of the driver seat motor 4a is set such that the driver seat webbing 2a is retracted when the deceleration G is Dr. For the seats other than the driver seat, to keep the shift amount of the occupants other than the driver within the target level, the operation threshold values of the front passenger seat motor 4b and the rear seat motor 4c are set such that the front passenger seat webbing 2b and the rear seat webbing 2c are retracted when the deceleration G is As. In this way, while avoiding making the occupants other than the driver feel uncomfortable by being pulled too much with a strong force, it is avoided that the driver feels annoyed due to a too early timing of retraction of the webbing.

Next, a manner of setting a motor operation threshold value will be concretely explained with reference to FIGS. 4 and 5. FIGS. 4 and 5 show operation threshold values of the driver seat motor 4a and the motors of the seats other than the driver seat (front passenger seat motor 4b and rear seat motor 4c) are shown with the axis of ordinate being the pressing speed of the brake pedal 6 and the axis of abscissa being the pressing amount of the brake pedal.

Figure 4:
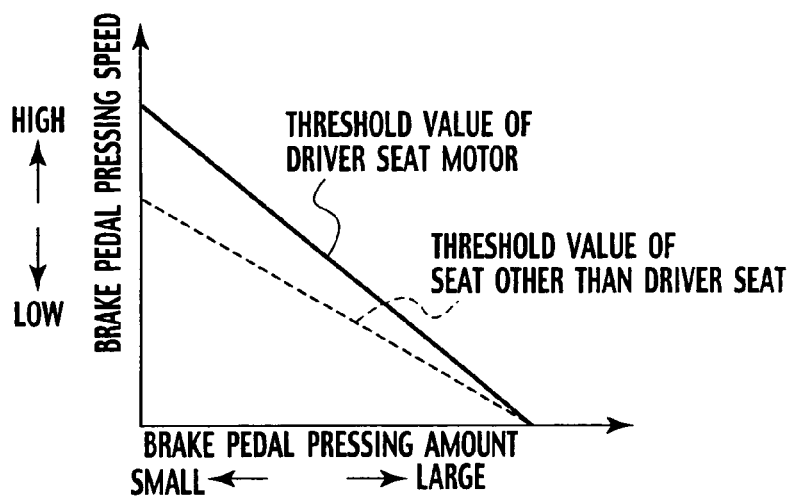
FIG. 4 is a view for explaining an example of a manner of setting a motor operation threshold value.

In FIG. 4, when the pressing speed of the brake pedal 6 is low, the threshold values of the driver seat motor 4a and the motors of seats other than the driver seat are set to be substantially the same, in accordance with the pressing amount of the brake pedal 6. As the pressing speed of the brake pedal 6 becomes high, threshold values in accordance with the pressing amount are set such that the difference between the threshold value of the driver seat motor 4a and the threshold values of the motors of seats other than the driver seat becomes large.

When the pressing speed of the brake pedal 6 is low and the deceleration G is relatively small, thus being assumed to be not really urgent, the timings of retraction of the webbings of the driver seat and the other seats are set to be substantially the same. As the pressing speed of the brake pedal becomes high, the deceleration G becomes relatively large. Accordingly, the timings of retraction of the webbings of the seats other than the driver seat are set to be earlier than that of the webbing of the driver seat.

In FIG. 4, the operation threshold value of the motors of the seats other than the driver seat is shown by a straight line, and the difference in the operation threshold values between the motors becomes large in proportion to the pressing speed, that is, a direct function relationship. However, the relationship between the difference in the motor operation threshold values and the pressing speed of the brake pedal 6 is not limited thereto, and may be a relationship of a multiple order function with the motor operation threshold value of the seats other than the driver seat being a curved line.

Figure 5:
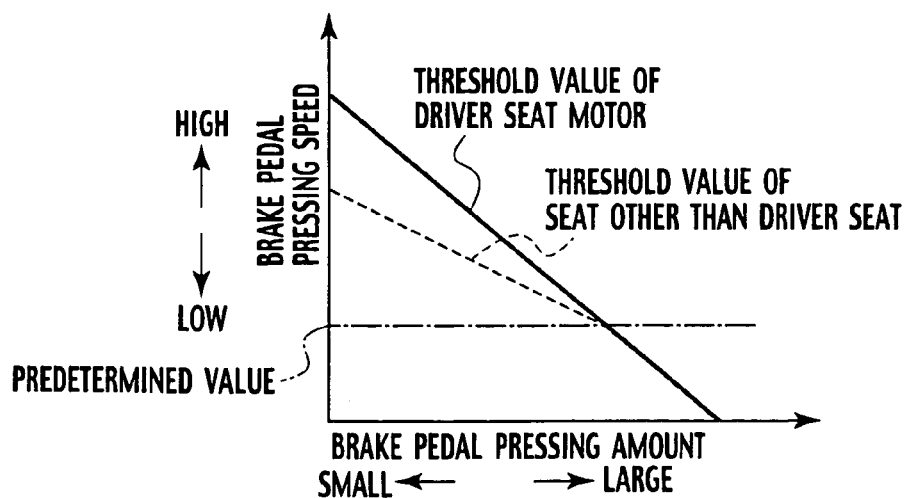
FIG. 5 is a view for explaining another example of manner of setting a motor operation threshold value.

In FIG. 5, when the pressing speed of the brake pedal 6 is below a predetermined value, the motor operation threshold values of the driver seat motor 4a and the motors of the seats other than the driver seat are set to be substantially the same. Further, when the pressing speed of the brake pedal 6 is the predetermined value or more, the operation threshold values are set such that the difference between the threshold value of the driver seat motor 4a and the threshold values of the motors of the seats other than the driver seat becomes large as the pressing speed of the brake pedal 6 becomes higher.

When the pressing speed of the brake pedal 6 is low, the deceleration G is relatively small and it is assumed to be not really urgent. If the timing of retraction of the webbings of the seats other than the driver seat dares to be earlier than the timing of retraction of the webbing of the driver seat, there is a possibility to make the occupants other than the driver feel annoyed. Thus, after the pressing speed of the brake pedal 6 exceeds a predetermined speed, the timings of retraction of the webbings of the seats other than the driver seat are set to be earlier than that of the webbing of the driver seat.

In FIG. 5, in case that the pressing speed of the brake pedal 6 is the predetermined value or more, the operation threshold value of the motors of the seats other than the driver seat is shown by a straight line, and the difference in the operation threshold values between the motors becomes large in proportion to the pressing speed, that is, a direct function relationship. However, the relationship between the difference in the motor operation threshold values and the pressing speed of the brake pedal 6 is not limited thereto, and may be a relationship of a multiple order function with the motor operation threshold value of the seats other than the driver seat being a curved line.

In FIG. 5, there may be a plurality of predetermined values for the pressing speed, and the range of the pressing speed of the brake pedal 6 may be divided into a plurality of sections, each having a straight line different from each other or a different curved line.

As described above, the occupant protection device of the present invention includes: the driver seat motor 4a which retracts the driver seat webbing 2a; front passenger seat motor 4b which retracts the front passenger seat webbing 2b; rear seat motor 4c which retracts the rear seat webbing 2c; brake pedal sensor 7 which detects movement of the brake pedal 6; and control device which actuates each motor when the detection value of the brake pedal sensor 7 has exceeded the motor operation threshold value, and retracts each webbing to restrain each occupant. Moreover, by means of the ECU 11, the operation threshold values of the front passenger seat motor 4b and the rear seat motor 4c are set to a value lower than the operation threshold value of the driver seat motor 4a, thereby allowing the timing of retraction of the webbings of the seats other than the driver seat to be earlier than the timing of retraction of the webbing of the driver seat. Thus, even at the time of unexpected braking such as emergency braking, it is possible to prevent the webbing tension from making the occupants feel uncomfortable while reducing the frontward shift of the occupants.

Further, in the occupant protection device of the present invention, the pressing amount and the pressing speed of the brake pedal 6 are detected by the brake pedal sensor 7. When the pressing speed of the brake pedal 6 is low, the motor operation threshold values in accordance with the pressing amount of the brake pedal 6 are set such that the threshold values of the driver seat motor 4a and the motors of the seats other than the driver seat are the substantially the same. As the pressing speed of the brake pedal 6 becomes higher, the threshold values are set such that the difference between the operation threshold values of the driver seat motor 4a and the motors of the seats other than the driver seat becomes larger. Thus, an appropriate timing of retraction of the webbings in accordance with the emergency can be realized, and it is possible to reduce the possibility to make the occupants feel annoyed.

Moreover, in the occupant protection device of the present invention, when the pressing speed of the brake pedal 6 is below a predetermined value, the motor operation threshold values of the driver seat motor 4a and the motors of the seats other than the driver seat are set to be substantially the same. When the pressing speed of the brake pedal 6 is the predetermined value or more, the operation threshold values are set such that the difference between the threshold value of the driver seat motor 4a and the threshold values of the motors of the seats other than the driver seat becomes large as the pressing speed of the brake pedal 6 becomes higher. Thus, a more appropriate timing of retraction of the webbings in accordance with the emergency can be realized, and it is possible to reduce the possibility to make the occupants feel annoyed.

Furthermore, since the control is performed irrespective of the value of the current which passes through the motors, unlike the earlier techniques, it is not necessary to make large scales of the motors and the ECU. Accordingly, the scale of the device does not become large and the cost thereof does not increase.

The entire content of a Japanese Patent Application No. P2004-122743 with a filing date of Apr. 19, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An occupant protection device, comprising:
   a first motor which retracts a webbing of a driver seat;
   a second motor which retracts a webbing of a front passenger seat or a rear seat;
   a brake pedal sensor which detects a pressing amount and a pressing speed of a brake pedal; and
   a control device which controls the first motor to retract the webbing of the driver seat when a detection value of the brake pedal sensor has exceeded an operation threshold value of the first motor, and controls the second motor to retract the webbing of the front passenger seat or the rear seat when the detection value of the brake pedal sensor has exceeded an operation threshold value of the second motor, wherein, in the control device, the operation threshold value of the second motor is set to be lower than the operation threshold value of the first motor, the operation threshold values of the first and second motors in accordance with the pressing amount of the brake pedal are set to be substantially the same when the pressing speed of the brake pedal is low, and the operation threshold values of the first and second motors in accordance with the pressing amount of the brake pedal are set such that the difference between the operation threshold values becomes larger as the pressing speed of the brake pedal becomes higher.

2. An occupant protection device according to claim 1, wherein, in the control device, when the pressing speed of the brake pedal is below a predetermined value, the operation threshold values of the first and second motors in accordance with the pressing amount of the brake pedal are set to be substantially the same.

3. An occupant protection method, comprising:

detecting a pressing amount and a pressing speed of a brake pedal by a brake pedal sensor;

retracting a webbing of a driver seat by a first motor when a detection value of the brake pedal sensor has exceeded an operation threshold value of the first motor; and retracting a webbing of a front passenger seat or a rear seat by a second motor when a detection value of the brake pedal sensor has exceeded an operation threshold value of the second motor, wherein the operation threshold value of the second motor is set to be lower than the threshold value of the first motor, the operation threshold values of the first and second motors in accordance with the pressing amount of the brake pedal are set to be substantially the same when the pressing speed of the brake pedal is low, and the operation threshold values of the first and second motors in accordance with the pressing amount of the brake pedal are set such that the difference between the operation threshold values becomes larger as the pressing speed of the brake pedal becomes higher.

* * * * *